United States Patent [19]

Young et al.

[11] Patent Number: 4,972,208
[45] Date of Patent: Nov. 20, 1990

[54] METHOD AND APPARATUS FOR IMAGE FRAME LENGTH CONTROL

[75] Inventors: Timothy Young, Williamson; David J. Reed, Rochester; Fereidoon S. Jamzadeh, Fairport, all of N.Y.

[73] Assignee: Eastman Kodak Company, Rochester, N.Y.

[21] Appl. No.: 399,186

[22] Filed: Aug. 28, 1989

[51] Int. Cl.$^5$ ....................... G01D 15/16; G03G 21/00
[52] U.S. Cl. .................................... 346/108; 355/311; 346/136
[58] Field of Search ................... 346/1.1, 108, 107 R, 346/160, 136; 355/311

[56] References Cited

U.S. PATENT DOCUMENTS

| | | | |
|---|---|---|---|
| 3,934,505 | 1/1976 | Kushner | 101/129 |
| 4,082,443 | 4/1978 | Draugelis et al. | 355/4 |
| 4,361,260 | 11/1982 | Hanlan | 226/30 |
| 4,779,944 | 10/1988 | Ritter et al. | 350/3.71 |
| 4,785,325 | 11/1988 | Kramer et al. | 355/8 |
| 4,801,978 | 1/1989 | Lama et al. | 355/69 |
| 4,803,515 | 2/1989 | Hoshino et al. | 355/4 |
| 4,835,545 | 5/1989 | Mager et al. | 346/1.1 |

Primary Examiner—Mark J. Reinhart
Attorney, Agent, or Firm—Mark Z. Dudley

[57] ABSTRACT

Image frame length control apparatus and methods are disclosed which have particular utility in a printing or reproduction apparatus that writes one or more images on a transported photosensitive media such as a photoconducting drum or continuous-loop web. When an electronic writing system or optical exposure system is used to expose a driven media on a line-by-line basis, a variation in media thickness causes the latent image frame to be written with an inaccurate frame length. Consequently, a degraded print is produced.

The latent image frame length is corrected during exposure, by adding or omitting one or more lines in the image frame. Alternatively, the exposure of an image is offet by an interval corresponding to one-half of the total length discrepancy between the uncorrected image frame length and the image frame length that would be written if the media surface speed was at a median level. The overall image length error is thereby reduced by half and distributed to the upper and lower extremities of the image frame. In another embodiment, the rotation rate of the media is increased or decreased when a respectively thin or thick portion of the media passes over the driving apparatus.

The corrected image fames are written with greater fidelity to the original and, after development and transfer to a receiver, are particularly well-suited for use in forming an accurate multicolor reproduction.

21 Claims, 5 Drawing Sheets

METHOD AND APPARATUS FOR IMAGE FRAME LENGTH CONTROL

CROSS REFERENCE TO RELATED APPLICATION

This application is related to the commonly-assigned, copending U.S. application Ser. No. 248,075, filed on Sept. 23, 1988 in the name of F. S. Jamzadeh.

BACKGROUND OF THE INVENTION

1. Field of the Invention

This invention relates, in general, to printing and reproduction apparatus and, more specifically, to image frame length control for images produced in hard copy scanning printers, including laser printers, and other apparatus having photosensitive media.

2. Description of the Prior Art

In high speed electrostatographic reproduction apparatus, it is a common practice to employ photosensitive media in the form of an elongated photoconductive web (or a photoconductive coating on a drum) adapted to record transferable images. Such media moves in a path in operative relation with various electrophotographic process stations. Ultimately a transferable image is created and transferred to a receiver to produce a print or reproduction.

In making monochrome reproductions with an apparatus utilizing a uniformly charged photosensitive media, areas of uniform charge are exposed to light to form a charge pattern, or latent image frame. In the color reproduction arts, the image frame can be designed to correspond to one of a set of related color separation images; several successive image frames on the media may thus constitute a separations set. The latent images are developed with pigmented marking particles to form transferable images. Each image is transferred sequentially to a respective receiver member that may in turn be used as one of the several color separations for a composite multicolor reproduction. Alternatively, each image may be transferred directly to a single receiver to create a multichromatic (multicolor) print in one step.

The sequential separation images must be accurately registerable in order to obtain faithful multicolor reproductions. In such color applications, the transferable images generated from such successive "master" separations must be aligned for accurate superimposed registration during the creation of a multicolor composite print.

Even monochrome reproductions that are not intended for use in composite images may require accurate reproduction of finely-spaced lines or other minute, repetitive image components. Such components in a detailed original (for example, a map or chart) must be reproduced with fidelity to the original image. Non-uniformity in the writing of the latent image on the media can cause a noticeable image degradation: a finely ruled reticular grid in a reproduction of an image will appear uneven in thickness and spacing; a reproduction of an image having a grey-scale pattern will have noticeable density gradient variation as well.

In a web-based reproduction or printing apparatus, the web is typically supported by several freely turning rollers and driven by one drive roller. (In alternative reproduction apparatus, a driven drum assembly is substituted for the web and rollers.) Because these driving assemblies are electro-mechanical systems, there is a tendency for the web (or drum) to vary in speed as it is driven. Moreover, because the web or drum is photosensitive and typically is exposed line-by-line by a laser beam or a linear LED array, any speed variation of the media will cause the exposure lines to be written at differing inter-line spacing. The sum of this effect is that different image frames on the photosensitive media will have images of differing length. Those image frames, when developed and transferred, will produce reproductions with correspondingly disparate frame lengths.

Referring now to FIG. 1 in particular, there is shown a reproduction apparatus 8 which includes a laser scanner 10 for emitting a laser beam 12. An LED linear array and other non-laser light sources are also useable. A photosensitive media, in this example a photoconductive web 14, is constructed in an endless loop and disposed around rollers, such as rollers 16, and is rotated in the direction indicated by arrow 18. The exposing or imaging station 20 includes a driving means, such as a drive roller 22. For clarity, the drive roller 22 is assumed to include all other required motor apparatus not specifically illustrated in FIG. 1. During the operation of the printer, the web 14 travels across roller 22 and is cleaned by a brush 18 and charged at a charging station 19. The web is then exposed, line by line, by the laser beam 1Z which is controlled by suitable electronics to construct a desired electrostatic latent image Frame on the web 14. This latent image frame moves, with the movement of the web 14, through other stations of the printer. At the development station 24, toner is applied to the web 14, and at the transfer station 26, the developed image on the web 14 is transferred, with the aid of the transfer roller 28, to a receiver. The receiver travels along the guide 32 and between the rollers 16 and 28 for transfer of the image from the web 14. Further details on the illustrated printer may be found in the aforementioned U.S. application Ser. No. 248,075.

As further example, it will be noted that a drum-based system may be found to operate similarly, in that the web 14 and rollers 22 and 16 may be replaced by a photosensitive drum of sufficient circumference to engage the electrophotographic process stations in the same manner. The drum is also driven by a motor and exposed to the laser beam 12 to receive a latent image at its surface on a line-by-line sequence. For clarity, however, the background of the present invention will be discussed with reference to the illustrated web-based system.

In the production of a latent image frame, any speed variation of the photosensitive media must be held to a minimum; otherwise, the successive latent image frames are likely to have differing lengths. The resulting misregistration of the developed and transferred image frames must be held within acceptable limits. Gross variations in web speed are caused by a variety of mechanical factors which affect the web transport speed, such as roller bearing or drive motor friction, line voltage changes, assymetry of the drive motor poles, or misalignment of the apparatus support chassis with respect to the axes of the web transport rollers and the web drive means. Much improvement has been made in the art to reduce such gross speed variation to a level that is acceptable for most printing and reproduction applications.

In Mager et al., U.S. Pat. No. 4,835,545, a photosensitive media moving in a first direction, relative to a laser light beam scanning in a second direction, incurs velocity variation which cause variations in the absolute and relative heights of white and black image features. An instantaneous velocity error calculation is used to adjust the intensity of the laser light beam to be proportionally brighter (dimmer), exposing a wider (narrower) scan line, on a faster-moving (slower-moving) media region.

In Hoshino, et al., U.S. Pat. No. 4,803,515, an image forming apparatus includes a movable image bearing members and a driver for driving the image bearing member. The time interval required for the image bearing member to move from a latent image forming position is an integer multiple of a period of the drive non-uniformity inherent in the driver.

In Lama et al., U.S. Pat. No. 4,801,978, a control circuit is provided in an electronic printer utilizing an image write bar to compensate for the effects of vibration in a rotating photoconductive member. In Kramer et al., U.S. Pat. No. 4,785,325, a document imaging system incorporates a mechanism for adjusting the speed ratio between the document scanning system and the photoreceptor. In Ritter et al., U.S. Pat. No. 4,779,944, an integrated laser scanning system for scanning a modulated beam across an image surface (receptor) is provided. The variation in rotational speed of the receptor is discussed as a major source of scan line spacing error in images recorded with a laser scanner.

In Hanlan, U.S. Pat. No. 4,361,260, a register control is provided for a web handling apparatus wherein a control provides a timed modification to a sensed speed signal for providing a modified speed command signal when the system is out of registration. In Draugelis et al., U.S. Pat. No. 4,082,443, digital logic circuitry ensures that latent images are correctly placed on a photoconductor, by varying the timing of the flash assembly.

In Kushner, U.S. Pat. No. 3,934,505, a method and apparatus are disclosed wherein a signal proportional to the speed of a moving web is compared with a signal proportional to the speed of a motor-driven rotary printing member, and a resultant corrective signal is transmitted to the control for a motor. The linear speed of the rotary printing member is thus made equal to the web speed.

A residual amount of media transport speed variation has, until now, been assumed to be irreducible. This residual speed variation has generally been unrecognized or unimportant in the many prior art printing or copying machines which produce single images that are not of critical fidelity. However, all image frames that are produced on a machine having this speed variation will have varying frame lengths. The length variation becomes most obvious and objectionable when the image frames are used to reproduce a color document. One image may be developed and transferred to a receiver for use as one in a set of color separations or color masters that are employed in a second machine, such as a xeroprinter, to make a color print. Or, several images may be developed and transferred in superposition onto a single receiver to make a composite color print. In both instances, the disparity of the image frame lengths will cause a noticeable misregistration and color shift in the color print.

While perfecting the web transport of the illustrated reproduction apparatus 8, we have found much, if not all, of this residual speed variation to be due to a variation of the surface velocity of the photosensitive media. More importantly, we have found this variation in web surface velocity to be directly attributable to variations in the thickness of the web.

As shown in FIGS. 1a and 1b, a driving means, such as the drive roller 22 in the web-based system, or the drum core 23 in a drum-based system, may be assumed to rotate at a constant angular velocity $\mu$. The web transport speed v is observed at points on the midpoint depth d of the material. A radius, taken from the arc described by the path d to the center axis of a drive means, will increase and then subside to normal as a relatively thicker section passes around the drive means. Simultaneously, because the web is continuous, the surface velocity of all points in the media also increases and then subsides. The same radius will decrease when a thin section passes over the drive means and respectively the web transport speed (and the surface speed) will decrease. Therefore, an image written to any area on the web during such surface speed changes will have a frame length that is respectively increased or decreased.

As noted above, this phenomena is due to the nature of the transport speed of a continuous material driven in an endless configuration. With reference again to FIGS. 1A and 1B, any surface point on such a continuous media (the web 14 or the drum coating 23a) will have an increase in surface velocity $V_2$, as the thick part of the web passes over the driving means. Conversely, the media will have a lower surface velocity ($V_1$) when a thin section of the web passes over the drive means. When a section of the web having a median thickness (neither thick nor thin) passes over the drive roller, the surface speed $V_s$ is at a median speed which is an amount between $V_1$ and $V_2$. (In a drum-based system, the thickness variation is definable as the variation of the radius of the drum 23 which includes photosensitive coating 23a; the drum 23 cross-section may thus be understood as non-circular. This variation is illustrated by radius $r_1$ or $r_2$ drawn from the center of rotation c to respective surface points.)

Although a subtle phenomena, the residual speed variation is repeatable and predictable. In researching the speed variation on a 3-image frame web in the illustrated apparatus 8, 306 prints were generated and then measured for image length with a precision of $+/-2$ micrometers. The web thickness variation was first measured and found to be varying some 12 micrometers above and below a median thickness of 190 micrometers. Each print that was written while a thin part of the web was on the drive roller 22 was found to be shorter than those written when the web thickness at the drive roller 22 was at its median level. The converse was true for prints made while a thick section of the web was at the drive roller. Disparities of image lengths of approximately 40 micrometers were observed; for example, a web 14 that had a thickness variation of 6 micrometers produced image frame length variations of about 30 micrometers over 177,000 micrometers of image length. When compared to an average image line width of 14 micrometers, such disparity is significant. The magnitude of the length difference was found to be directly proportional to the divergence of the web thickness from a median thickness. Hence, we noted that a solution to the problem lies in first recording the thickness variation of the web or the drum and then correlating these variation to a predicted web surface speed variation. It should be noted that the web surface speed variation due to this thickness variation would be reducible if the media could be manufactured to a precisely uniform thickness. However, such a solution is quite expensive, and is thus impractical.

The residual speed variation is not found in a non-looping web system that is driven by two pinch rollers. Because the web is not a loop and the pinch rollers deform when a thick or thin portion of the web passes therebetween, the web surface speed is the same as the median web speed. However, this configuration of web drive is uncommon.

Multicolor reproduction apparatus that produce composite color images, or other apparatus that produce color separations useable for high volume reproduction work, present strict registration requirements. In an apparatus wherein either monochromatic (separation) or multichromatic (color print) reproductions are made, i.e., for composite printing, copying, or duplicating applications, there is a significant likelihood that a disparity in image frame lengths will degrade the image quality of the composite image. Hence, the inconsistency of media transport speed becomes a significant limiting factor in obtaining quality color reproductions from such an apparatus. The production of a misregistered separation set is costly in that any subsequently-generated composite image is inaccurate and the printing process must be halted while a new set of separations are made. In the color reproduction industry, such a waste of process time is significant and is to be avoided.

Moreover, in printers and scanners that use image data that is transferred to and from a digital memory, the image frame lengths in the digitized data stream are often precisely controlled. Yet, when such images are written in an apparatus that suffers from the above-described residual speed control, this frame length precision is forfeited.

SUMMARY OF THE INVENTION

It is an object therefore of the invention to provide a method and apparatus for correcting the above-described media transport speed variation in a scanning, printing, or other reproduction apparatus.

In accordance with the invention, method and apparatus are provided for image frame length control in a scanning apparatus employing a driven photosensitive media having a median thickness and variations therefrom. The method comprises the steps of storing a profile of thickness variations of the photosensitive media, receiving image information, rotating the media to provide a location for creation thereon of a latent image frame according to the received image information, calculating the predicted frame length of the latent image according to the thickness profile and the image frame location, offsetting an imagewise exposure of the media by an interval proportional to one-half of the disparity between the predicted image frame length and the correct image frame length, and imagewise exposing the media on a line-by-line basis according to the stored image information to create a latent image thereon. The latent image frame length is thus corrected with respect to the predicted frame length.

In another embodiment of the invention, a method for image frame length control comprises the steps of storing a profile of thickness variations of the photosensitive media, receiving image information, rotating the media to provide a location for creation thereon of a latent image frame according to the received image information, calculating the predicted frame length of the latent image according to the thickness profile and the image frame location, adjusting the speed of rotation according to an amount proportional to the disparity between the predicted image frame length and the correct image frame length, and imagewise exposing the media on a line-by-line basis according to the received image information to create a latent image thereon, whereby the latent image frame length is corrected with respect to the predicted frame length.

In still another embodiment of the invention, a method for image frame length control comprises the steps of storing a profile of thickness variations of the photosensitive media, receiving image information, rotating the media to provide a location for creation thereon of a latent image frame according to the received image information, calculating the predicted frame length of the latent image according to the thickness profile and the image frame location, imagewise exposing the media on a line-by-line basis according to the received image information to create a latent image thereon, and providing in the exposure of the latent image at least one line exposure to be repeated or omitted according to an amount proportional to the disparity between the predicted image frame length and the correct image frame length, whereby the latent image frame length is corrected with respect to the predicted frame length.

In another embodiment, a reproduction apparatus for providing exposure of a rotated photosensitive media having a median thickness and variations therefrom, comprises a detector for detecting the position of the photosensitive media, an image memory for receiving image information, a scanner, modulated according to the image information and the media position, for imagewise exposure of the media on a line-by-line basis to form a latent image thereon, and a master controller for storing a thickness profile of the media, calculating the predicted latent image frame length according to the thickness profile and the media position, and controlling the imagewise exposure according to the disparity between the predicted image frame length and the correct image frame length, whereby the latent image may be written with a correct frame length.

The invention has substantial and significant application to almost all forms of printing and reproduction apparatus in use with the exception of those which image a photosensitive media by flash exposure. Therefore, the invention provides a significant improvement to laser scanning systems, LED printers and copiers, and moving mirror scanners. Also improved are scanning, printing, and copying systems which operate on a moving original, such as a flat bed scanner.

BRIEF DESCRIPTION OF THE DRAWINGS

In the detailed description of the preferred embodiment of the invention, reference is made to the accompanying drawings, in which.

Figure 1:
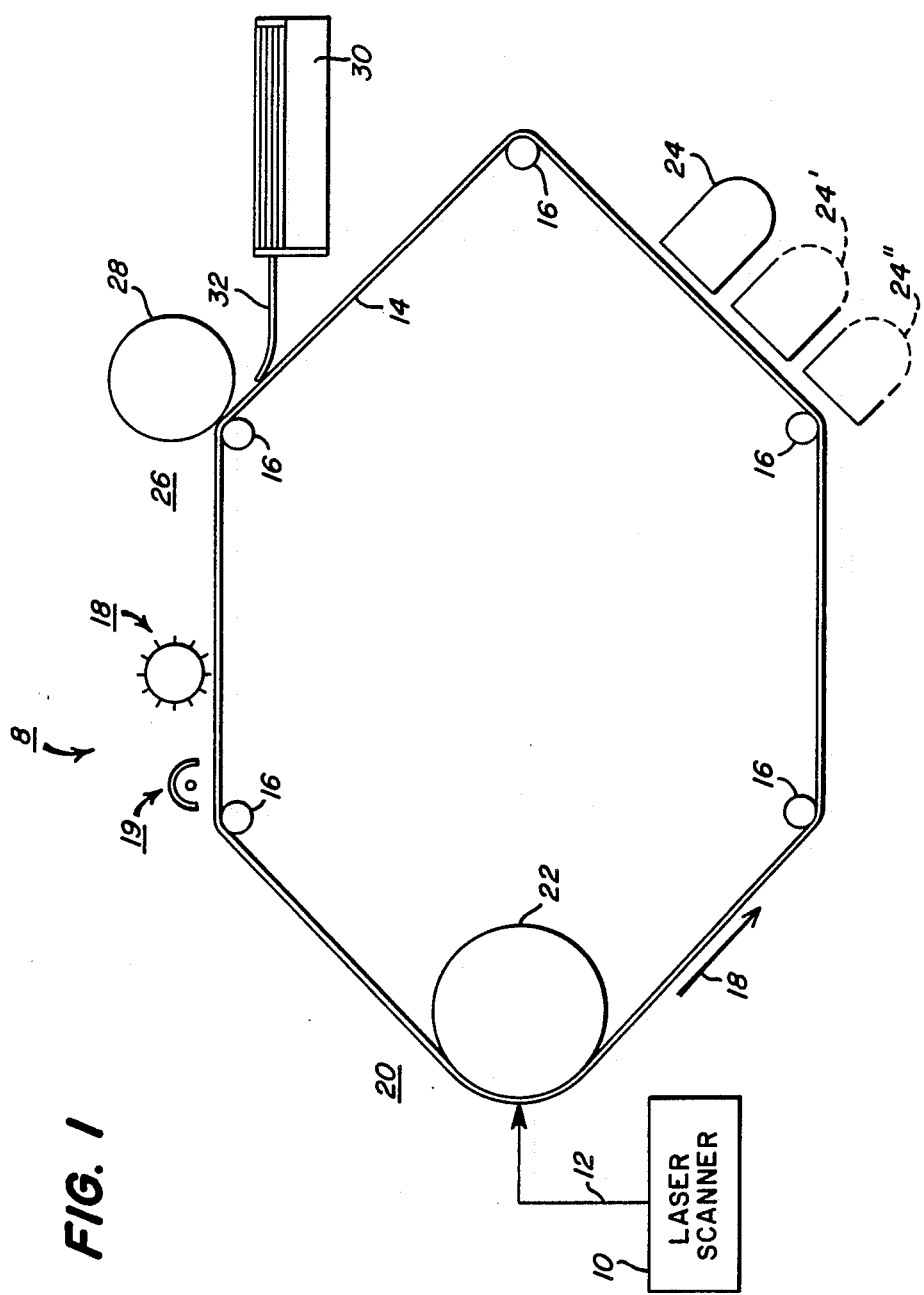
FIG. 1 is a schematic view illustrating the operation of a web-based laser printer constructed according to the present invention.

In the drawings and specification to follow it is to be understood that like numeric designations refer to components of like function.

DESCRIPTION OF THE PREFERRED EMBODIMENT

The apparatus of the preferred embodiment will be described in accordance with an electrostatographic recording media. The invention, however, is not limited to methods and apparatus for creating images on such media, as other photosensitive media such as photographic film, etc. may also be used to advantage within the spirit of the invention. Because electrostatographic reproduction apparatus are well known, the present description will be directed in particular to elements forming part of, or cooperating more directly with, the present invention. Apparatus not specifically shown or described herein are selectable from those known in the prior art.

Figure 1A:
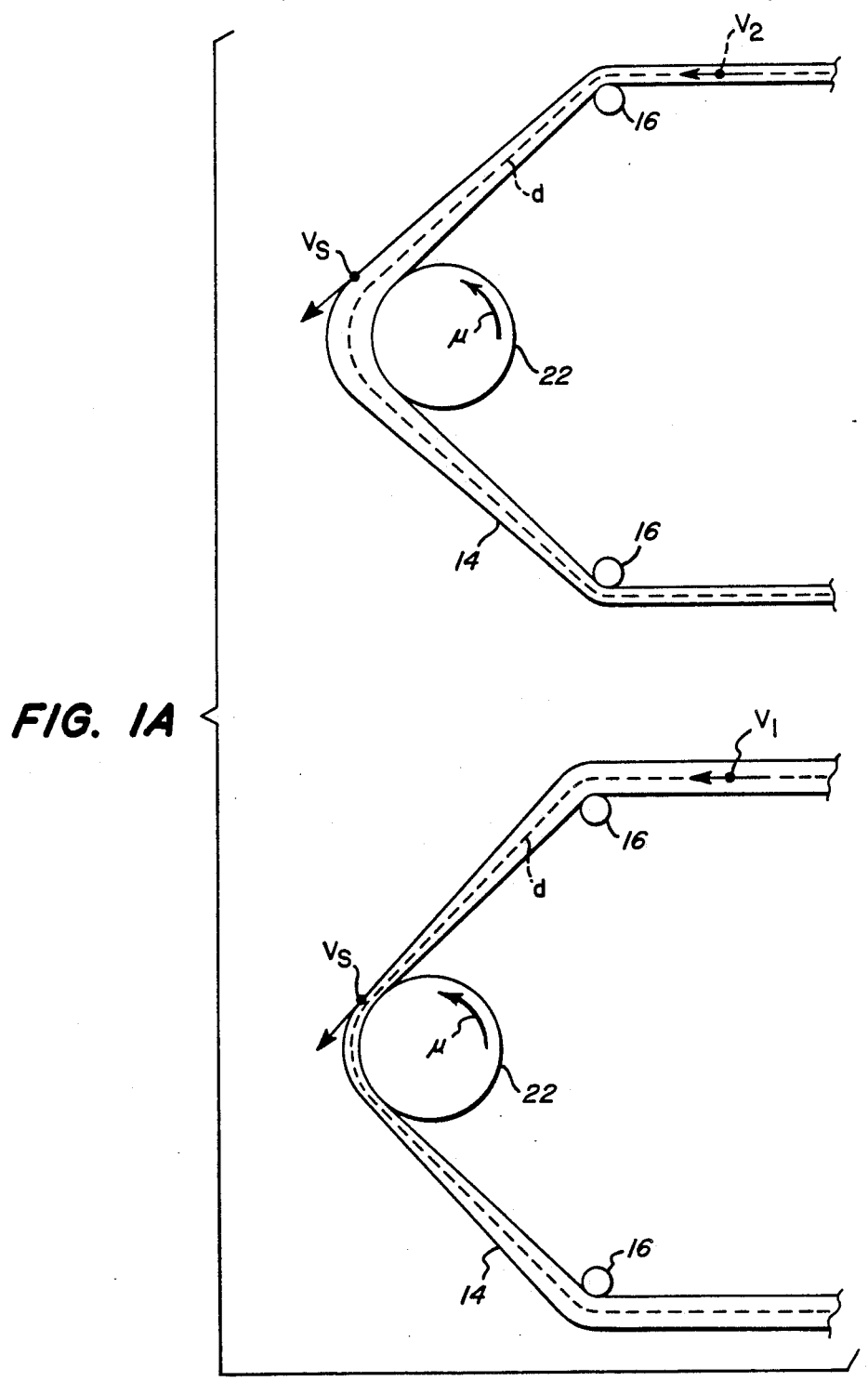
FIGS. 1A and 1B are diagrammatic side view illustrations representing the movement of the photosensitive media of FIG. 1, as it rotates about a path or around a drum center point, with illustrated elements exaggerated to facilitate a description thereof.
Figure 1B:
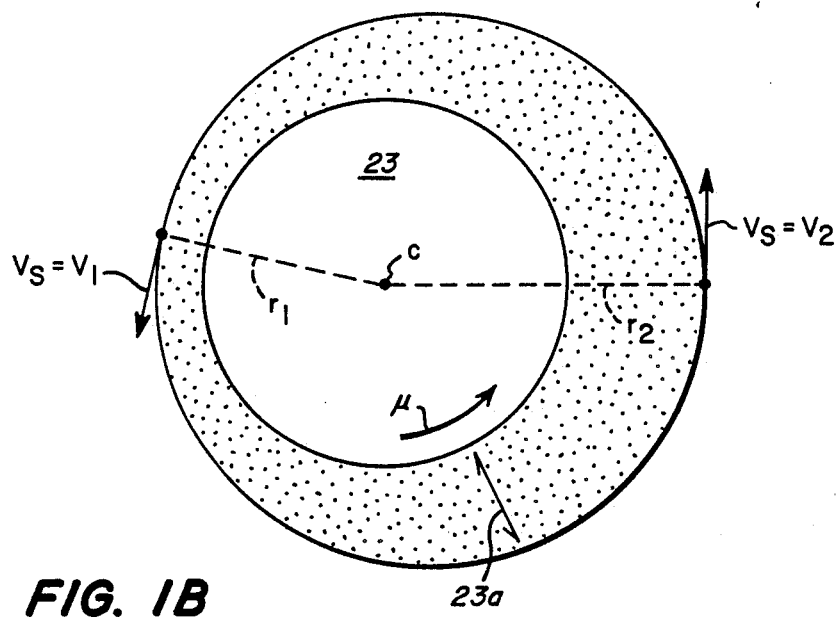
Figure 2:
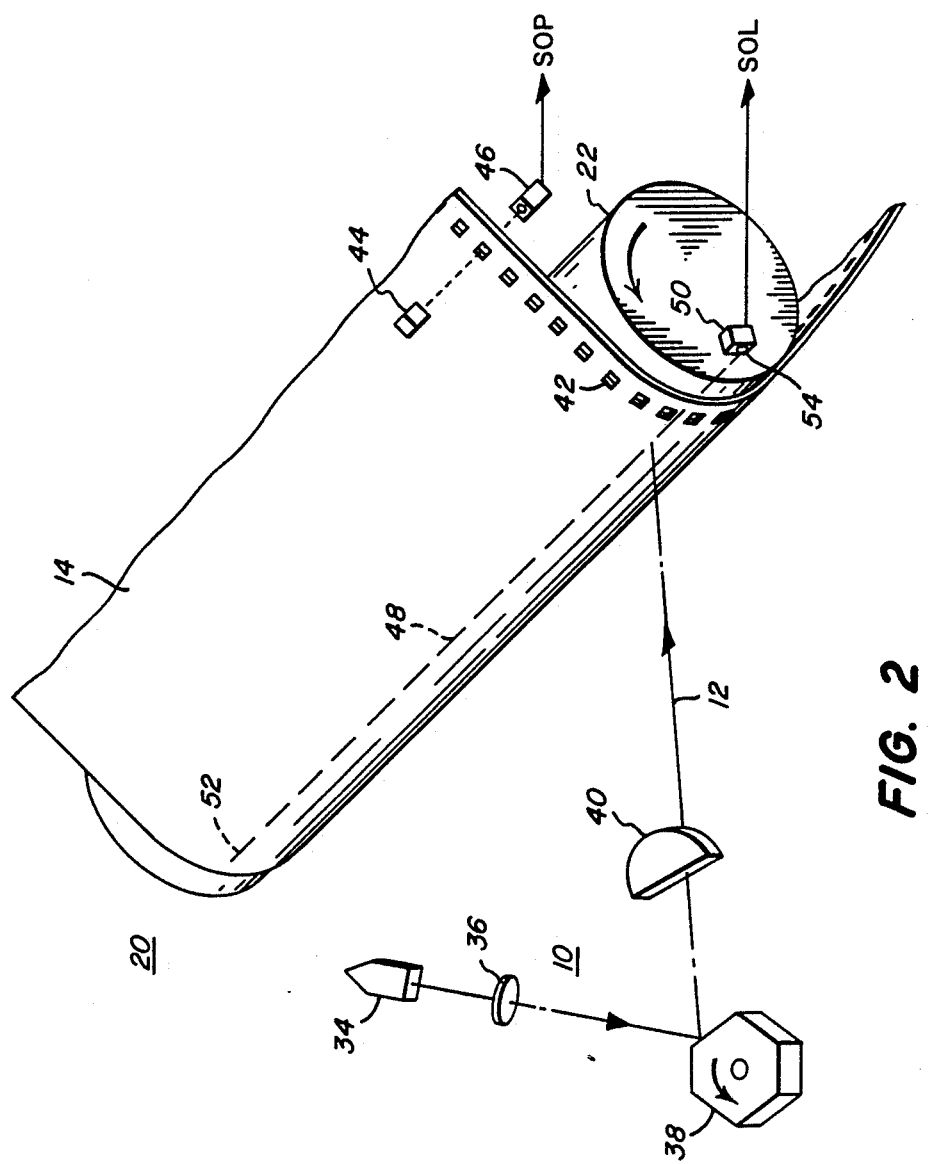
FIG. 2 is a schematic perspective view of the scanning and exposing portion of the printer shown in FIG. 1.

Referring again to FIGS. 1, 1a, and 1b, and now to FIG. 2, a laser printer apparatus 8 of the electrophotographic type is shown, which employs a dielectric photoconductive web 14 adapted to carry transferable images as was discussed in reference to the background of the present invention. The web 12 is, for example, of the type described in U.S. Pat. No. 3,615,414.

An exposure station 20 is operated according to a typical multicolor electrophotographic process. The charged web 14 is moved in the direction of arrow 18 about its closed loop path. Areas corresponding to image frames on the charged web are then exposed at station 20 to light from a laser source 10 that is directed to the web 14. The exposure alters the uniform charge and forms a latent image (a charge pattern) at each exposed image frame. The charge pattern corresponds to the modulating image information furnished to the laser source 10 by a suitable data source, such as a computer, optical scanner, or other appropriate signal source. It should be understood that the various image frames are separated either spatially, i.e., apart from each other by a distance on the length of the web; or temporally, whereby the same image frame is used to form different color separation images in succeeding time periods.

In making multicolor reproductions by, for example, the subtraction color process, the data used to modulate the light from the laser 10 is divided into primary color separation images each of which modulate the exposure of a successive image frame. Thus each latent image frame represents one respective color separation image of a set that comprises a composite multicolor reproduction. In the case of the illustrated scanner 20, the light beam 12 moves in the laser scanner's main scanning direction while being modulated by image information that is provided on a dot by dot basis for each scan (or exposure) line. The web 14 is continuously advanced in the web path direction 18. Alternative light sources, such as a LED printhead or other point-like radiation sources, may be used in place of the exposure station 20. Still other line-by-line exposure sources, such as imaging sources which include direct optical recording from originals, may also be used.

The modulated electrostatic charge patterns thereby formed are developed with pigmented marking particles by a development station 24 to transform each latent image to a transferable image. The development station Z4 includes a developer which may consist of iron carrier particles and pigmented electroscopic toner particles with an electrostatic charge opposite to that of the latent electrostatic image. The developer is brushed over the photoconductive surface of the web 14 and the toner particles adhere to the latent electrostatic image to form a visible, transferable image. The development station may be of the magnetic brush type with one or two rollers. Alternatively, the toner particles may have a charge of the same polarity as that of the latent electrostatic image and the image is developed in accordance with known reversal development techniques.

The images are then transferred seriatim from the image frames of the web 14 to a corresponding number of receiver members that are advanced in timed relationship for engagement with the web 14 at the transfer station 26. After transfer, the receiver is removed from the transfer roller and transported to a fuser (not shown) where the toned image is fixed to the receiver.

A monochrome reproduction, or a set of individual color separation images on separate receivers, may be produced as described hereinabove with a single development station 24. The single monochrome reproduction (using a toner of, for example, black pigment) may be simply an accurate copy or print from an original image. Alternatively, the reproduction may be intended for use as one of the color separations, or masters, of a color composite image and as such may be utilized in a high-speed xeroprinting, lithographic, or other printing system.

The image frame length correction method and apparatus as taught according to the present invention is directed not only to the illustrated apparatus 8 but to any reproduction apparatus in which the surface of a moving photosensitive media is exposed in a line-by-line exposure to generate one or more image frames for the formation of transferable images. The apparatus 8 may be modified to include, for example, a plurality of development stations 24 (with additional stations 24' and 24" shown in phantom) so as to generate a multicolor reproduction of the original image on a single receiver sheet. A respective plurality of modulated electrostatic charge patterns (image frames) as described hereinabove are thereby developed with colored toner particles, each color provided from one in a respective plurality of development stations, to form a set of transferable images. The several images are then transferred seriatim from their respective image frames of the web 14 to a single receiver. The receiver is recirculated on or about the transfer roller 28 in synchronization with the approach of each image frame of the web 14 and is urged onto the web 14 in alignment with a toned image. The set of transferred images forms an accurately superimposed, multicolor composite image on the receiver. Further details regarding a multicolor reproducing apparatus are provided in U.S. Pat. No. 4,777,510, the contents of which are incorporated herein by this reference. The receiver can be of a variety of compositions, including but not limited to paper, aluminum plate, transparent film stock, treated film stock such as nickelized ester or photoconductive film.

FIG. 2 is a view illustrating the preferred exposure station 20 in more detail. The laser system includes a laser 34, lens 36, rotating mirror 38, and a f−θ lens 40. Actual operating exposure stations may contain more and different types of lenses for a particular application, but the arrangement shown in FIG. 2 is illustrative of the invention and is simplified in the interest of clarity. The beam of light produced by the laser 34 is modulated by associated electrical circuitry not shown in FIG. 2. Although the modulation may be digital, that is, the beam may be switched on or off, other forms of modulation may be used. It is also within the contemplation of the invention that the laser beam could be modulated in an analog fashion for the purpose of creating different levels of beam intensity by using a suitable modulator, such as an acousto-optical modulator.

According to FIG. 2, the web 14 contains perforations 42 along an edge of the web which are used to determine the location of the web and measure its passage as it rotates around the rollers of the printer. The light emitter 44 and the light detector 46 provide a means for determining the location of the web 14 using the perforations 42. The actual location may be a translation from the number of light detections, pulses, or "tick" marks generated by the emitter 44 and detector 46. In counting the number of pulses detected by the light detector 46, the exact location of the web anywhere around the path of travel can be determined. Thus, when the area of the web 14 in which an image is to be written is at a position where the image would be started, the light detector 46 effectively senses the image area position. For example, when an image area is adjacent to the scan line 48, the start of page (SOP) signal is, in effect, generated by the light emitter 44, light detector 46, and the associated electronic counting circuitry.

The SOP signal indicates that the photoconductive web 14 is physically in position to receive scanned information from the laser scanner 10 to construct the latent image on the web 14. After the SOP signal is produced, data is fed to the laser 34 for the purpose of modulating the laser beam 12 as it scans the scan line 48. However, modulation of the laser beam does not start until the exact location of the laser beam is determined. This is determined by the detection of the laser beam by the light detector 50 which signifies that the laser beam has returned substantially to the edge of the web 14 and is starting another transition across the web along scan line 48. When such a detection or start of line (SOL) signal is produced, the beam modulation may begin. Note that although the laser beam 12 may be oriented anywhere along the scan line 48 at that particular moment because of the rotation of the mirror 38, the laser beam 12 would be in the off state pending the start of exposure of the web. In the worst case, the laser beam 12 may be just past the light detector 50 when the SOP signal is issued, thereby requiring that the laser beam travel to the end 52 of the scan line until the mirror moves the beam 12 to the beginning position 54 of the scan line 48.

Figure 3:
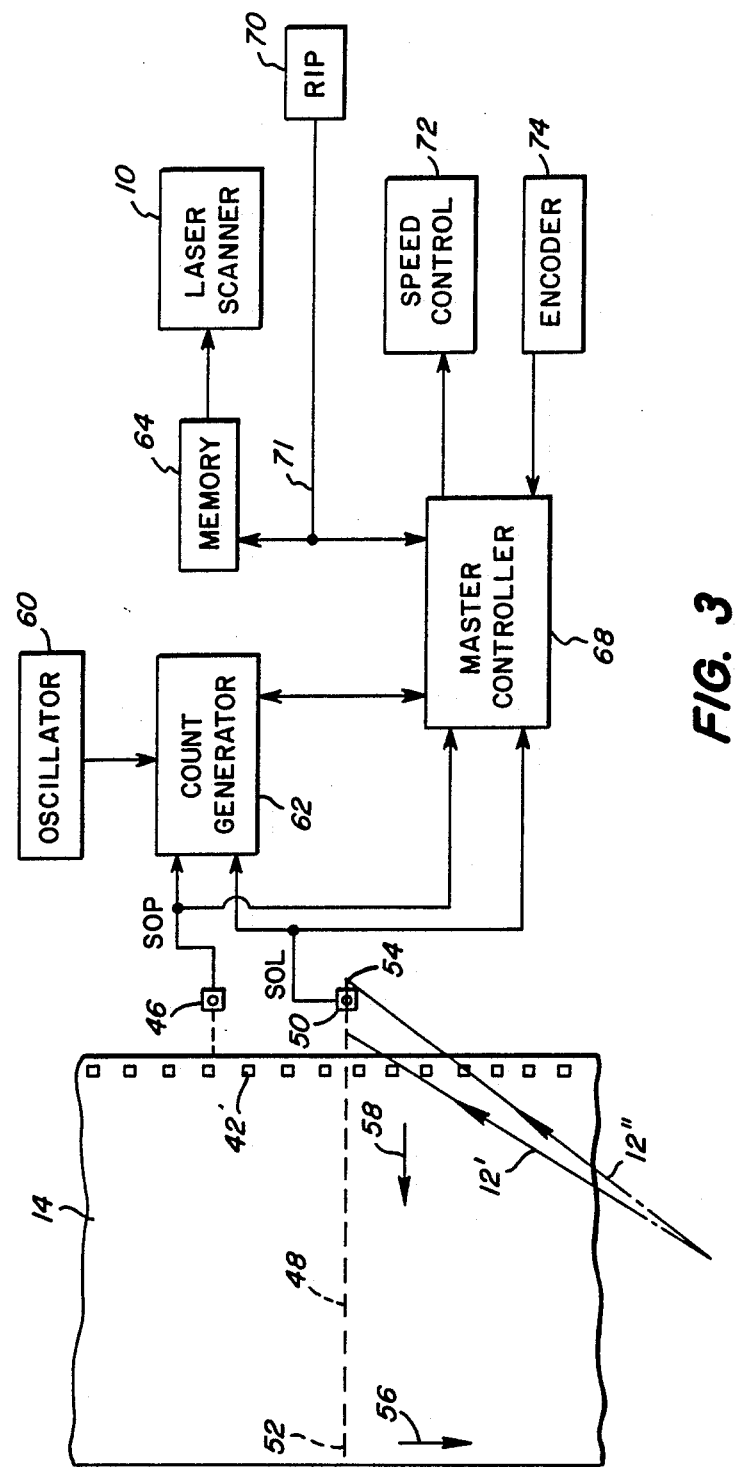
FIG. 3 is a block diagram illustrating a circuit arrangement for implementing the image frame length correction as taught by the invention.

FIG. 3 shows an embodiment of the frame length correction apparatus according to the present invention. Note that the photoconductive surface does not have to be in the form of a web to benefit from the teachings of the present invention. A rotating drum or roller of photoconductive material can also be corrected using the embodiments to be described. For clarity, however, the web-based system will be described.

Because the residual web speed variation is repeatable and its magnitude depends upon the magnitude of thickness variation and the drive roller radius, the web thickness is measured before mounting in the reproduction apparatus 8. The thickness profile is measured and compiled with respect to a reference, such as an enlarged perforation 42, then entered and stored in the correction apparatus as will be discussed below. The stored profile is revised only if a new web is installed.

The web 14 is driven in direction 56 and the laser beam moves in direction 58 along scan line 48. The laser beam is detected by the light detector 50 after the SOP signal has been issued. Assuming that the laser beam 12' is at the indicated position when the SOP signal is issued, the SOL signal will not issue until the beam 12 scans the line 48 completely and returns to scan the line again beginning at the position of laser beam 12" where it trips the detector 50 and issues the SOL signal. The difference between the two signals is calculated by a master controller 68 which senses a signal produced by a count generator 62. The oscillator circuit 60 provides clocking pulses to the count generator 62, although other electrical circuits may be used to generate the same output characteristics. The count generator 62 counts the number of oscillator pulses from oscillator 60 after the SOP signal has been received and before the SOL signal is received. Logic gates within the generator 62 activate, deactivate and reset the counters therein during the time interval between the receipt of the two start signals, namely the SOP and the SOL signals.

The master controller 68 having logic and microcomputing circuitry is provided to vary a web speed control 72 according to information received from the count generator 62 and a web position encoder 74 on the drive roller 22. The information received also informs the master controller of the position of the web 14. The aforementioned web thickness record is digitally encoded, then entered and stored in a random access memory (RAM) portion of the master controller 68 by known techniques. Hence, the location of the thick and thin sections are available to the master controller for predicting the location and the length disparity of image frame locations that (without correction) would be correspondingly longer or shorter than normal. The web speed control 72 alone is capable of maintaining the drive roller speed to compensate for the gross speed degradation described above with reference to the prior art. A signal provided from the controller 68 to the control 72 can be used to effect a precision speed control for image frame length correction a will be taught herein.

The output of the count generator 62 applied to the master controller 68 allows the controller to control the release of rasterized image information from an image memory 64. The image data thus flows from the image memory 64 to the scanner 10 under the control of the master controller 68. The image data is rasterized by a rasterizing image processor (RIP) 70 and originates from a variety of image data sources (not shown), such as a computer, word processing system, or image scanner.

In the following, three particular embodiments of the invention will be described with reference to FIG. 3. Each embodiment utilizes the stored thickness profile of the particular photosensitive media that was installed on the printer. (In the following, it is assumed that the master controller 68 monitors the web position and has determined that, during the writing of the latent image, the web surface speed will change due to a thickness variation.) Briefly stated, the master controller 68 in each embodiment correlates the thickness profile to a set of stored image frame length variation curves and the uncorrected image frame length variation is predicted. (The image frame length variation curves have been derived empirically from the photosensitive media transport geometry and drive configuration for the illustrated apparatus 8, and are already stored in the master controller 68.) The image frame length is then controlled to provide an image frame having a length that more nearly equals the original.

In a first embodiment of the present invention, the master controller 68 controls a latent image frame length by offsetting (advancing or retarding) the start of laser beam line scanning, as shown in FIG. 2, by an offsetting time interval. This interval is equal to an amount of web rotation equal to one half of the difference between the latent image to be corrected and the median frame length. For example, the timing for writing a short image frame (due to a thin web section) will be retarded to produce a color separation which, when superimposed with the remaining separations that form a composite image, will be centered in the composite image. The image frame length disparity is thus distributed evenly at the top and bottom of the composite image. The maximum misregistration of the corrected image frame is then half of that which would appear without the correction. Also, because the misregistration after offsetting is less noticeable at the center of the composite image, and is most evident at the top and bottom of the reproduction, its effect on the perceived color fidelity is diminished.

In a second embodiment of the present invention, the effective length of an image frame is changed by precisely decreasing or increasing the speed of the drive roller 22 during the time that a (respectively) thick or thin section of the web passes over the drive roller 22. The web transport speed is respectively decreased or increased and the latent image is accordingly written over a longer or shorter frame. The master controller 68 controls web speed according to pulses provided to the web speed control 72. An image frame that (without correction) would be shorter or longer, respectively, is written to have a compensated length that matches the median image frame length.

Figure 4:
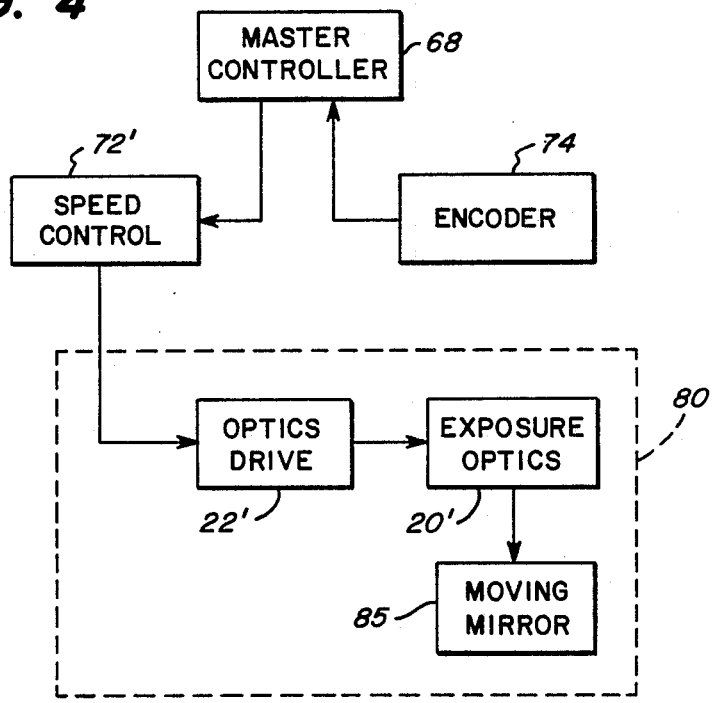
FIG. 4 is a block diagram segment of FIG. 3 illustrating the circuit as it is applied to frame length correction in an alternative embodiment usable in non-electronic image data printer system.

Alternatively, in a conventional optical scanning electrophotographic apparatus 80 that utilize an optical (non-electronic) exposure system (such as a moving-mirror system 85), the effective length of the latent image frame may be adjusted by changing the velocity of the exposure optics. As shown in FIG. 4, an exposure optics speed control 72' provides a motor drive signal to the exposure optics drive means 22' to control the speed of the exposure optics 20'. The precision control of the exposure optics speed is mechanically equivalent to the precision control of the speed of the drive roller 22 in an electronic exposure system as was described with reference to FIG. 4. However, the polarity of the drive signal to the moving optics drive means 22' is opposite to the signal profile provided to the drive roller 22. That is, the drive signal to change the speed of a moving mirror system (for example) would be increased when a thick portion of the web passes over the drive roller 22; the same speed would be decreased with respect to a thin portion of the web.

In a third embodiment of the present invention, the master controller 68 controls the image frame length by reconstructing or omitting a scan line (line exposure) during the exposure of the latent image to be corrected. When writing on an image frame that would otherwise be shortened by the effect of a thin portion of the media, the controller 68 causes the scanner 10 to reconstruct a line exposure. Thus, scan line data from memory 64 is used to repeat the immediately preceding line exposure. Alternatively, the reconstructed line can be written as a reconstruction of both the preceding and the following lines; i.e., the adjacent line data copied from memory is merged to create a reconstructed line exposure. The result of either process is the insertion of an additional line exposure by the scanner 10. Conversely, the master controller 68 omits an image line at a frame that is lengthened by a thick section. The omission or reconstruction can be repeated as necessary and is done, preferably, at an area within the frame where the change will have the least visual effect. Known algorithms for image data contrast and frequency analysis may be used in the master controller 68 to detect such an image field. An example would be to omit or reconstruct a line while exposing a flat field portion of the image, e.g., in scan lines that depict an unvariegated sky in an outdoor scene.

The apparatus and method disclosed herein permits the construction of a reproducing or printing apparatus that provides a reproduction of an original document with great fidelity. Reproductions that are to be used singly, as in non-color applications, will have more uniform image length and line spacing. Reproductions that are to be used as color separations will combine with improved color registration in the composite print. This fidelity and registration accuracy may be implemented in any line-scanning printing or copying apparatus.

It is emphasized that numerous changes may be made in the above-described apparatus and method without departing from the teachings of the invention. It is intended that all of the matter contained in the foregoing description, or shown in the accompanying drawings, shall be interpreted as illustrative rather than limiting.

What is claimed is:

1. A method for image frame length control in a scanning apparatus employing a driven photosensitive media having a median thickness and variations therefrom, comprising the steps of:
   storing a profile of thickness variations of the photosensitive media;
   receiving image information;
   rotating the media to provide a location for creation thereon oF a latent image frame according to the received image information;
   calculating the predicted frame length of the latent image according to the thickness profile and the image frame location;
   offsetting an imagewise exposure of the media by an interval proportional to the disparity between the predicted image frame length and a correct image frame length; and
   imagewise exposing the media on a line-by-line basis according to the stored image information to create a latent image thereon;
   whereby the latent image frame length is adjusted with respect to the predicted frame length.

2. An image frame length control method as claimed i claim 1 wherein the interval comprises one-half of the disparity between the predicted image frame length and the correct frame length.

3. An image frame length control method as claimed in claim 1 wherein the step of offsetting comprises retarding or advancing of the latent image scan exposure in proportion to a decrease or increase, respectively, in the surface speed of the media during exposure with respect to the median web speed.

4. An image frame length control method as claimed in claim 1 wherein the step of imagewise exposure comprises exposure of the media to a scanning laser beam.

5. An image frame length control method as claimed in claim 1 wherein the step of imagewise exposure comprises exposure of the media to light from a LED array.

6. An image frame length control method as claimed in claim 1 wherein the image information received is color separation information.

7. An image frame length control method as claimed in claim 1 wherein the step of imagewise exposure comprises exposure of the media to light from a moving mirror scanner.

8. A method for image frame length control in a scanning apparatus employing a driven photosensitive media having a thickness and variations therein, comprising the steps of:
  storing a profile of thickness variations of the photosensitive media;
  receiving image information;
  rotating the media to provide a location for creation thereon of a latent image frame according to the received image information;
  calculating the predicted frame length of the latent image according to the thickness profile and the image frame location;
  adjusting the speed of rotation according to an amount proportional to the disparity between the predicated image frame length and a correct image frame length; and
  imagewise exposing the media on a line-by-line basis according to the received image information to create a latent image thereon;
  whereby the latent image frame length is corrected with respect to the predicted frame length.

9. An image frame length control method as claimed in claim 8 wherein the step of offsetting further comprises the step of retarding or advancing of the latent image scan exposure in proportion to a decrease or increase, respectively, in the surface speed of the media during exposure.

10. An image frame length control method as claimed in claim 8 wherein the step of imagewise exposure comprises exposure of the media to a scanning laser beam.

11. An image frame length control method as claimed in claim 8 wherein the step of imagewise exposure comprises exposure of the media to light from a LED array.

12. An image frame length control method as claimed in claim 8 wherein the step of imagewise exposure comprises exposure of the media to light from a moving mirror scanner.

13. A method for image frame length control in a scanning apparatus employing a driven photosensitive media having a thickness and variations therein, comprising the steps of:
  storing a profile of thickness variations of the photosensitive media;
  receiving image information;
  rotating the media to provide a location for creation thereon of a latent image frame according to the received image information;
  calculating the predicted frame length of the latent image according to the thickness profile and the image frame location;
  imagewise exposing the media on a line-by-line basis according to the received image information to create a latent image thereon;
  providing in the exposure of the latent image at least one line exposure to be reconstructed or omitted according to an amount proportional to the disparity between the predicted image frame length and a correct image frame length;
  whereby the latent image frame length is corrected with respect to the predicted frame length.

14. An image frame length control method as claimed in claim 13 wherein the step of imagewise exposure comprises exposure of the media to a scanning laser beam.

15. An image frame length control method as claimed in claim 13 wherein the step of imagewise exposure comprises exposure of the media to light from a LED array.

16. An image frame length control method as claimed in claim 13 wherein the step of imagewise exposure comprises exposure of the media to light from a moving mirror scanner.

17. A reproduction apparatus providing exposure of a rotated photosensitive media having a thickness and variations therein, comprising:
  a detector for detecting the position of the photosensitive media;
  means for imagewise exposure of the media on a line-by-line basis to form an image thereon; and
  a master controller for calculating a predicted latent image frame length according to a thickness profile of the media and the media position, and for controlling the imagewise exposure according to the disparity between the predicted image frame length and the correct image frame length;
  whereby the latent image may be written with a correct frame length.

18. An image frame length control apparatus as claimed in claim 17 wherein the master controller further comprises means for offsetting the imagewise exposure of the media by an interval proportional to the disparity between the predicted image frame length and the correct image frame length.

19. An image frame length control apparatus as claimed in claim 17 wherein the master controller further comprises means for offsetting the imagewise exposure of the media by an interval proportional to one-half of the disparity between the predicted image frame length and the correct image frame length.

20. An image frame length control apparatus as claimed in claim 17 further comprising means for adjusting the speed of media rotation according to an amount proportional to the disparity between the predicted image frame length and the correct image frame length.

21. An image frame length control apparatus as claimed in claim 17 wherein the master controller further comprises means for providing, in the imagewise exposure of the latent image, at least one line exposure to be reconstructed or omitted.

* * * * *